(12) United States Patent
Kobraei et al.

(10) Patent No.: US 8,421,647 B2
(45) Date of Patent: Apr. 16, 2013

(54) USE OF ONE LED TO REPRESENT VARIOUS UTILITY RATES AND SYSTEM STATUS BY VARYING FREQUENCY AND/OR DUTY CYCLE OF LED

(75) Inventors: Henry Kobraei, Louisville, KY (US);
John K. Besore, Prospect, KY (US);
Michael F. Finch, Louisville, KY (US);
Jeff Donald Drake, Louisville, KY (US)

(73) Assignee: General Electric Company, Schenectady, NY (US)

( * ) Notice: Subject to any disclaimer, the term of this patent is extended or adjusted under 35 U.S.C. 154(b) by 234 days.

(21) Appl. No.: 12/635,017

(22) Filed: Dec. 10, 2009

(65) Prior Publication Data

US 2011/0140906 A1 Jun. 16, 2011

(51) Int. Cl.
*G08B 23/00* (2006.01)

(52) U.S. Cl.
USPC ........... 340/870.07; 340/815.45; 340/693.3; 700/295; 700/296; 705/412

(58) Field of Classification Search ............ 340/815.45, 340/870.07, 310.11, 635, 693.3; 705/80, 705/26.3, 26.2, 412; 700/291, 296, 276, 700/295; 713/300; 702/130, 62; 323/318; 307/41; 715/867

See application file for complete search history.

(56) References Cited

U.S. PATENT DOCUMENTS

| | | | | |
|---|---|---|---|---|
| 8,027,752 | B2* | 9/2011 | Castaldo et al. | 700/296 |
| 2009/0092062 | A1* | 4/2009 | Koch et al. | 370/254 |
| 2009/0157529 | A1* | 6/2009 | Ehlers et al. | 705/26 |
| 2009/0236433 | A1* | 9/2009 | Mueller et al. | 236/51 |
| 2010/0052875 | A1* | 3/2010 | Boyadjieff | 340/332 |
| 2010/0138363 | A1* | 6/2010 | Batterberry et al. | 705/412 |
| 2010/0179708 | A1* | 7/2010 | Watson et al. | 700/296 |
| 2011/0061177 | A1* | 3/2011 | Kappler | 8/137 |
| 2012/0101651 | A1* | 4/2012 | Haynes | 700/295 |

* cited by examiner

*Primary Examiner* — Brent Swarthout
(74) *Attorney, Agent, or Firm* — Global Patent Operation

(57) ABSTRACT

A demand supply management system for an appliance receives information related to cost of energy use and communicates data to the associated appliance in response thereto. A single chip, light emitting diode (LED) device is preferably associated with a module or portion of the home appliance. The LED device conveys information relating to at least two of cost of energy use, signal strength, and module status. The LED device is preferably a single chip, single color solid-state LED device that is selectively actuated between "illuminated" and "non-illuminated" states, steady on, slow flash, fast flash, varying duration, intermittent "illuminated" and "non-illuminated", etc. to convey information to the user.

19 Claims, 2 Drawing Sheets

USE OF ONE LED TO REPRESENT VARIOUS UTILITY RATES AND SYSTEM STATUS BY VARYING FREQUENCY AND/OR DUTY CYCLE OF LED

BACKGROUND OF THE DISCLOSURE

The present disclosure relates to a module connected to a home appliance that provides a simple structure and manner of indicating at least two items of information, for example, at least two of network status, signal strength, and/or energy rate/level. More particularly, the disclosure relates to a low power indicator, preferably a single chip light emitting diode or LED device, that switches between the different items of information or modes, one of the modes being a default mode.

A recent development in the area of home appliances is to provide appliances that respond to demand supply management (DSM) signals from utilities for example to affect a possible load shedding event in the appliances. One approach is to employ a module operatively connected to the appliance that receives the signal from a utility, home energy manager, or other source that indicates a demand for the particular utility (electricity, gas, water, etc.). When demand is high, a corresponding cost of using the utility is high and a user is apprised of the increased utility rate. The user is presented with the option of selecting or preselecting a course of action in an effort to reduce utility usage or to delay/time-shift certain operations of one or more home appliances.

In some systems, a user interface, for example via an interface screen or menu driven device, is associated with each home appliance to allow the user to review the impact of the increased demand/costs, and to select a desired operation of the home appliance that may reduce utility usage. In other instances, the user preprograms a series of actions that one or more home appliances will automatically undertake in response to various threshold demand levels. Operation of one of more of the home appliances is likewise modified, and the user is apprised of the operative status of the appliance, e.g., the home appliance is operating in a low, normal, or high demand state.

Although such a complex user interface associated with each home appliance may be informative, it adds to the complexity and cost of an individual home appliance and the demand supply management system. Preferably, some type of external communication should be available and visible to the user, i.e., externally to the module or appliance, and be able to convey complex levels of information in a relatively simple, inexpensive manner.

Still another problem is how to conserve energy associated with the module, individual home appliance, or demand supply management system. Again, a user interface such as a touch-sensitive screen associated with each appliance requires a fair amount of energy to operate. Further, such a complex interface or home appliance must still be periodically updated with new utility rates or change in the demand supply response without adding unnecessary expense, complexity, or an additional energy use to the home appliance.

Consequently, a need exists for a system and method that overcomes one or more of the problems associated with a demand/supply system, and particularly the module or portion of the appliance that serves as an intermediary or middleman between the individual home appliance and the associated network.

SUMMARY OF THE DISCLOSURE

A demand/supply system for an associated appliance includes a module or portion of the home appliance that is adapted to receive information relating to cost of energy use and communicate data to the associated appliance in response thereto. A single, low power indicator operatively associated with the module/appliance conveys information relating to at least two of cost of energy use, signal strength, and module status.

Preferably, a single chip LED device is used.

Illuminated/non-illuminated states of the LED device vary in response to different data received from the module.

The duration of the illuminated/non-illuminated states of the LED device may vary in response to different data.

The illuminated/non-illuminated states include a steady illuminated state, a slow FLASH state, and a fast FLASH state, or combinations of one or more of these states.

A controller actuates the LED device to emit light from a constant illuminated state to an intermittent illuminated state.

The actuation may be periodic or non-periodic.

The LED device is mounted on an external surface of the module/appliance.

A method of displaying system information relating to an associated appliance includes providing a light emitting diode for displaying information relating to cost of energy use, signal strength, and/or status, and actuating the LED device in response to the cost of energy use for operating the associated appliance.

The method preferably includes using a single chip LED device for displaying the information.

The method includes periodically flashing the LED device, and/or altering a flash rate as the energy use cost changes.

The method includes cycling between different modes representative, for example, of cost of energy use, signal strength, and operating status.

The method further includes defaulting to one of the modes, preferably the cost of energy use mode.

A primary benefit is associated with the reduced cost of the simplified form of communication.

The system and associated methods are simple, small sized, low cost, and reduced power consumption for conveying information, all without a loss in functionality.

Still other benefits and advantages of the present disclosure will become apparent upon reading and understanding the following detailed description.

DETAILED DESCRIPTION OF THE PREFERRED EMBODIMENTS AND ASSOCIATED METHOD

Figure 1:
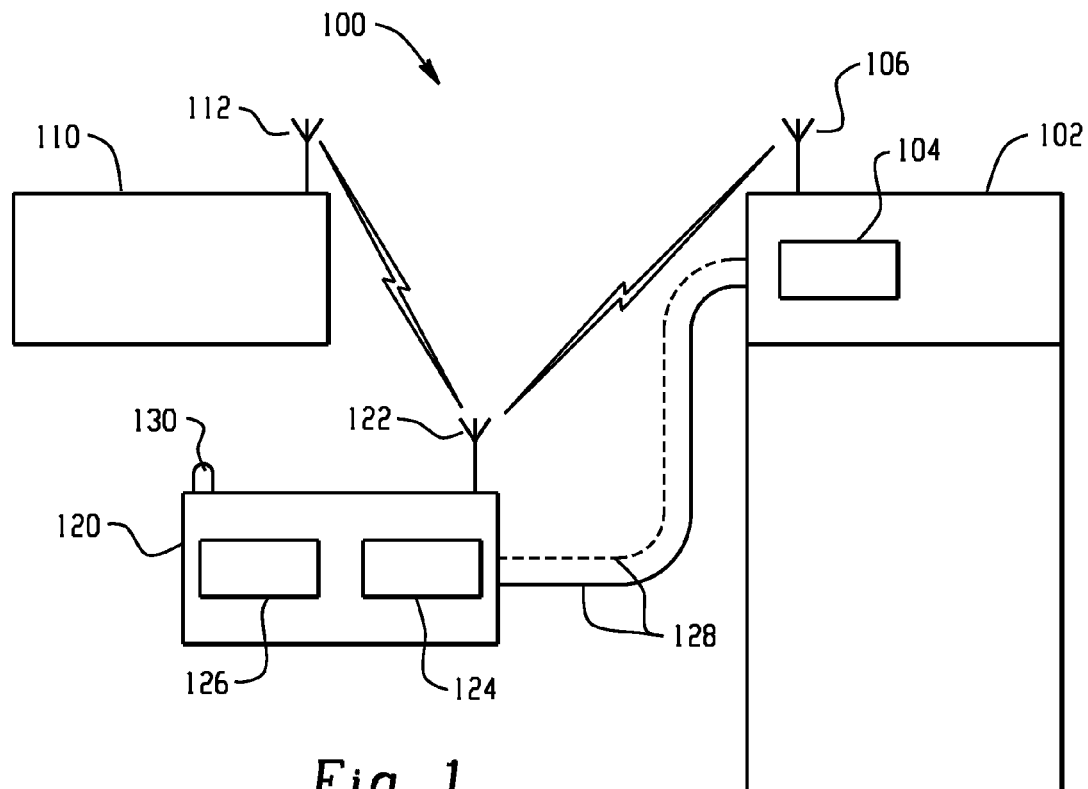
FIG. 1 is a schematic representation of a demand/supply system associated with one or more home appliances.

Turning first to FIG. 1, a first embodiment of a demand/response or demand/supply management system 100 is schematically illustrated. The system 100 includes one or more home appliances 102, each of which includes an associated microprocessor, microcontroller, or controller 104. The controller 104 controls operational aspects of the home appliance. Without unduly limiting the present disclosure, one example of a home appliance 102 is a refrigerator having a controller 104 that controls a temperature of the refrigerator compartment and/or associated freezer compartment. In a demand supply management system, the temperature may be altered in response to the cost of energy. For example, if a particularly high demand is experienced or imposed on the utility, the cost of that utility will likewise increase. A data transmitter 110 may be associated with a utility (electricity, gas, water, etc.) which emits data, for example wirelessly through antenna 112 or alternatively through a hardwired arrangement to convey the cost of using the utility. In some instances, the transmitter 110 may be associated with a neighborhood or subdivision, and thus the present disclosure should not be limited to those arrangements where only the utility is deemed to provide this information.

A demand/supply module 120 receives the emitted data from transmitter 110. More particularly, if the data is conveyed wirelessly, antenna 122 receives the wireless signal from transmitter antenna 112. Again, how the data or signal is received by the module 120 (e.g., directly or indirectly, wired or wirelessly) from the utility is not particularly important. However, the cost associated with the utility demand is interpreted by the module 120 and particularly, microprocessor/controller 124 that operatively receives the data from the antenna 122. A user interface 126 is optionally provided with the module to allow the user to input or program the controller and thereby determine operation of the home appliance. Although as mentioned in the Background, such an interface may be more conveniently associated with the utility or home energy manager 110, it is also contemplated that the use interface could be incorporated into the module if desired. The information regarding the cost of utility use is transmitted via wire or cable 128 or wirelessly from module antenna 122 to a home appliance antenna 106. The wired connection or the antenna 106 is operatively connected with the appliance controller 104 to control operation of the particular appliance.

As will be appreciated, each home appliance may include a respective controller 104, and is adapted to receive the information from the utility, home energy manager, etc. 110 via its own module 120. Such a module may be associated with a single appliance or alternatively may be associated with more than one appliance, e.g., one module may be sufficiently close to more than one kitchen appliance so that the single module is able to service multiple appliances, or similarly one module may be adjacent a clothes washer and dryer so that only one module is necessary to service these two appliances. However, f desired or if performance characteristics so dictate, each home appliance may have its own respective module. The individual controller associated with each appliance may be programmed to perform a certain operation or adopt a preselected operative state in response to the demand supply management signal. Of course the interface 126 could be a home computer or another type of user interface that allows the user to program predetermined operative characteristics into one or more appliances, and/or allow the user to select such action if prompted by the module. A light source such as a light emitting diode or LED device is used on the module to indicate that the module is activated, i.e., "power on", and is also used in a manner to convey multiple types of information as will be described below.

Figure 2:
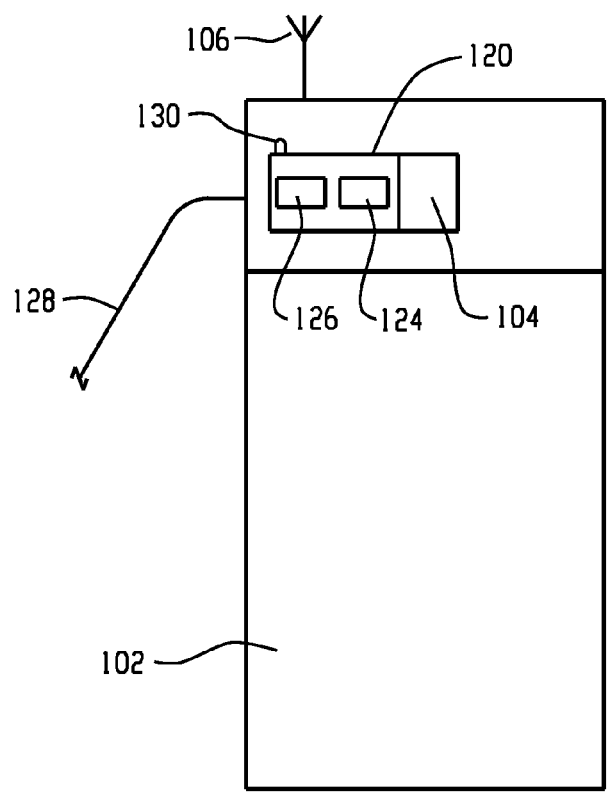
FIG. 2 is a schematic representation of an alternative demand supply management arrangement for a home appliance.

FIG. 2 is similar to the system of FIG. 1 except that the operative characteristics of the module 120 have been incorporated into the home appliance 102. Thus, microprocessor/controllers 104, 124 may be integrated together or could be separate components within the home appliance if so desired. Further, the module/home appliance includes a light source/LED device 130 that is visible from the exterior of the home appliance.

Figure 3:
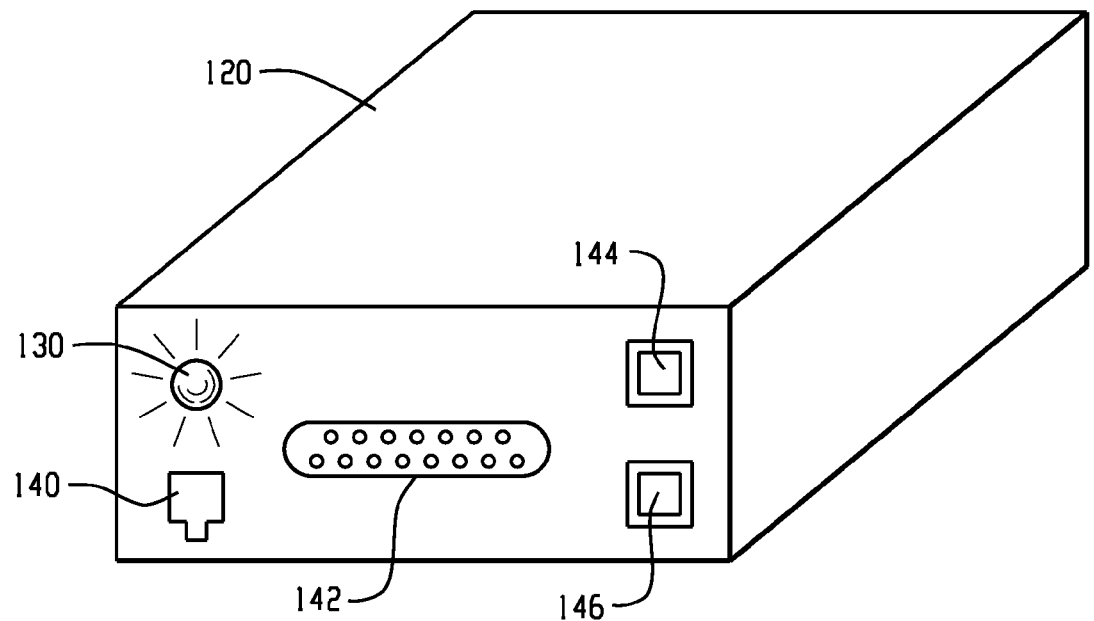
FIG. 3 is a perspective view of one preferred form of a demand supply management module.
Figure 4:
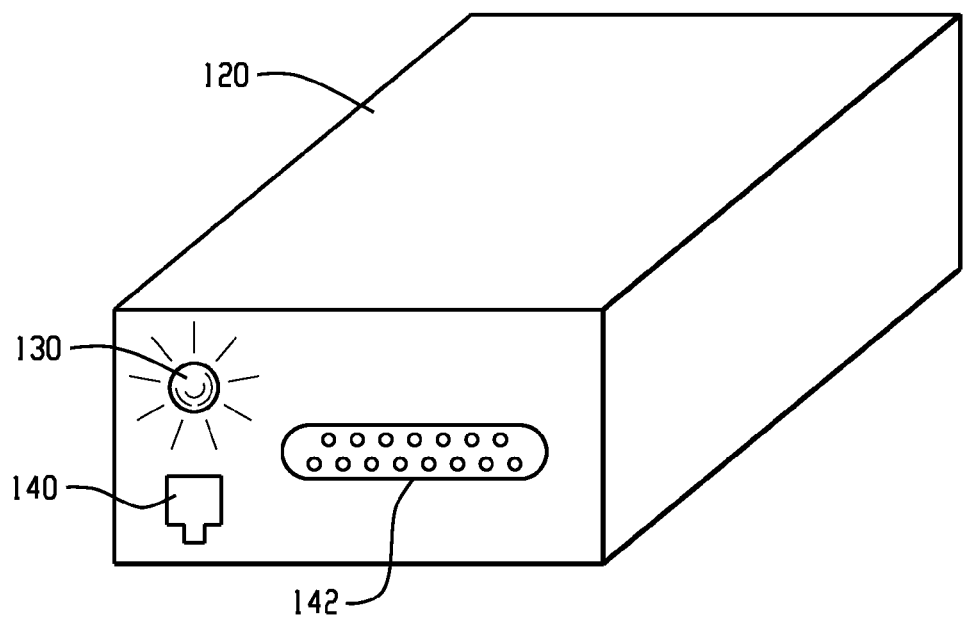
FIG. 4 is a preferred form of a demand supply management module employing a single chip LED device.

With continued reference to FIGS. 1 and 2, and additional reference to FIGS. 3 and 4, it will be appreciated that the module may be a component separate from the appliance (FIG. 1) or incorporated into the home appliance as shown and described with respect to the embodiment of FIG. 2. In any event, the user requires an indication of the operational status of the utility rate, signal strength, system status, etc. The module 120 of FIG. 3 includes one or more cable ports 140, 142. For example, cable ports 140 may be a telephone-jack style of connector, while the multi-pin receiver 142 could be a serial, parallel, USB, or other multi-pin connection port. These are simply representative of different types of connections that may be made with the module and should not otherwise be deemed to be limiting. Additionally, selector switches 144, 146 may also be provided on the module or along an external surface of the home appliance. By way of example only, switch 144 may be a simple ON/OFF switch. Likewise, and again by way of example only, switch 146 may allow the user to manually select which mode or operational characteristic of the module is visually active. One exemplary use would be to access the various modes of operation or display. Each time the switch 146 is actuated, e.g., depressed, a new mode is displayed.

Here, the display has been removed and the only external indicator or light source is a simple, single light emitting device or LED device 130. As used herein, the term "LED device" is to be understood to encompass bare semiconductor chips of inorganic or organic LEDs, encapsulated semiconductor chips of inorganic or organic LEDs, LED chip "packages" in which the LED chip is mounted on one or more intermediate elements such as a sub-mount, a lead-frame, a surface mount support, or so forth, semiconductor chips of inorganic or organic LEDs that include a wavelength-converting phosphor coating with or without an encapsulant. Thus, the LED device is preferably a single color, single chip which provides a small sized, inexpensive display that uses very little power. This is to be contrasted with present modules which may have an interface comprised of four to six LED devices or more of different colors. In the multi-color, multi-LED device displays of present arrangements, each individual LED device represents a different operational characteristic of the module. For example, one LED device may represent whether the module is ON or OFF, i.e., power state. Another LED device would be representative of the status of the module and whether it is receiving a signal from the utility, home energy manager, etc. Still another LED device may be representative of signal strength. Yet another LED device may be indicative of a particular energy rate/level, e.g., high, medium, low, or critical. Of course, these are only representative examples of the use of multiple LED devices and again should not be deemed to limit the present disclosure.

The embodiment of FIG. 4 is similar to FIG. 3 except that the module/portion of the home appliance is deemed to always be operational and thus there is no need for an ON/OFF switch, and the consumer is not given the opportunity to selectively actuate or select the display mode. Similar input ports 140, 142 may be provided for cable, wire, USB, etc. connections, and/or an antenna incorporated into the module/home appliance to receive a radio or wireless signal. Once again, only a single LED device 130 is necessary and is the preferred light source.

The single chip LED device 130 in FIGS. 3 and 4 is advantageously used to provide multiple types of information. Again, by way of example only, in a first mode of operation the LED device may illustrate or demonstrate network status, i.e., evidence whether the module is connected to the network and receiving or ready to receive data, or likewise send or transmit data. In a second mode, the LED device represents signal strength. For example, the LED device may remain constantly illuminated if there is a strong signal, or intermittently flash quickly if a medium strength signal is received, or flash slowly if a weak signal is available. Again, these are simply representative examples and need not be deemed as the sole manner of conveying such data in a second mode, representing signal strength. In a third mode, the energy rate or level may be displayed. Again, in the third mode, if the LED device is not illuminated, this may represent no change in the rates, while a steady or constant "illumination" may indicate that the rate is low. A slow flash may be indicative of a medium energy rate while a fast flash could be representative of a high or critical energy rate. It will also be appreciated that the intermittent flashing may be periodic or non-periodic if desired, or a duty cycle of the LED device may be varied. Thus, a single LED device can represent various information.

The module of FIG. 3 may allow the consumer to selectively actuate which mode the LED device displays. In the embodiment of FIG. 3, the user can manually step through the different modes by depressing switch 146. Alternatively, in FIG. 4, the single LED device may default to one of the modes, for example to the energy rate/energy level mode. The single LED device would then occasionally, either periodically or non-periodically, cycle through the other modes so that a single LED device by being operational in different modes can convey multiple types of data to the user/consumer. The user can differentiate between the different modes, for example, based on the flash rate of the LED device. For example, a fast flash may be representative of signal strength, a slow flash could represent energy rate, while an intermediate flash could represent the test or operational mode. In no two modes will the LED device flash at the same rate. Still other signaling pattern could be used. For example, the LED device could be illuminated for a single, one second time period to represent that the LED device is in the first mode (and then subsequently proceed to convey information in a predetermined manner, for example, as described above). Then after an active period of time in the first mode, the LED device would cycle to the second mode. To indicate that the second mode is being displayed, the LED device could be illuminated for two distinct illuminations, each for one second time periods as a precursor to the information to be conveyed by the LED device in the second mode. Similarly, the LED device would then cycle into the third mode as represented by some predetermined signal such as three distinct illuminations, each for a one second time period. Thereafter, information would be conveyed in the third mode in a predetermined manner. Of course, this is but one suggested manner of alerting the user as to the particular mode of operation of the LED device, and the present disclosure should not be deemed limited to this particular example, frequency (defined herein as 1/time period), duty cycle (defined herein as the proportion of time that the LED device is active in a time period, i.e., the ratio between the pulse duration and the time period), etc.

Whereas a present arrangement may be on the order of a four inch by four inch (4"×4") circuit board, the ability to convey this type of data through a single LED device may reduce the size of the circuit board on the order of two and one half by two inches (2½"×2"). This could be on the order of one sixth (⅙) the cost of the present arrangement. Again, such representative examples are intended only to be exemplary and not limiting. However, it is believed that such a module could be manufactured for approximately one sixth (⅙) the cost of the present module and have a significantly reduced power draw compared to the present arrangement. All of this is achieved without any loss of function or utility. Thus, a single chip LED device is the most desired arrangement, although multiple LED devices that convey information relating to at least two of cost of energy use, signal strength, and module status may also be desirable. The illuminated/non-illuminated state may be varied in response to different data received from the module. The duration of these illuminated and non-illuminated states of the LED device may likewise be varied. For example, a steady or constant illumination, intermittent slow flash, fast flash may be used to convey different types of information. Communication may also be provided by varying the duration of an illuminated state. For example, a Morse code or other coded communication scheme can be achieved through such a variation of the illuminated and non-illuminated state of the LED device. Although the present and preferred module has three different modes of operation representative of the cost of energy use, signal strength, and module status, it may be desirable to have different modes. Likewise, it is desired that a default mode be provided, i.e., the module will default to the cost of energy use.

A desired arrangement preferably locates the LED device 130 on an external surface of the associated appliance or at least on an external surface of the module if the module is itself separate from or mounted on the appliance. The intent is that the user can easily see the LED device as the user passes by the appliance. Likewise, the particular color may be selected so that the module is differentiated from other electronics that use LED devices in the home.

In summary, a wireless module connected to an appliance will vary the frequency (e.g. illuminated flash every one second or every three seconds, etc.) and/or duty cycle (e.g. 10% duty cycle where the LED device is illuminated for one-tenth of a second and not illuminated for nine-tenths of a second in a one second time period, or a 25% duty cycle where the LED device is illuminated for one-fourth of a second and is not illuminated for three-fourths of a second) of an LED device to indicate utility rate and/or system status. The LED device "steady illumination" may represent that the module is joined to a network and that the utility rate is low. An intermittent, slowly flashing LED device may represent that the node is joined to the network and that the utility rate is medium. An LED device flashing with an increased frequency, duty cycle or both may represent that the utility rate is high or critical. Again, these are representative examples only.

The LED device may return to a non-illuminated or sleep state after a period of time with no change in utility rates or no user interaction. Returning to a sleep state conserves energy. Alternatively, the LED device can continue in its functional/lit/energized state (at whatever illumination or frequency at which the LED device may be at the time) with either a change in utility rate or by user interaction with the system. For example, depressing or actuating a key 146 would alter the state or mode.

A switch or button on the wireless device can be used to join the module with the network. Likewise, the button can be used with a sequence of switch or button actuations at certain periods of time to enter a special service or test mode in order to be used to test utility rate signals to the home appliance.

The following is a representative example of using the LED device frequency to convey such information. Blinking constantly at a consistent rate when the wireless device is not joined or connected to the wireless network would be one state. If the LED device is in the always illuminated state when the unit is joined to the network, the utility rate is such that the appliance has the same response as it would have in a normal operation. On the other hand, if the LED device is blinking at a higher frequency of short bursts when the unit is joined to the network, the utility rate is such that the appliance changes its response in any way other than normal operation. Again, this is still another example of how different types of information can be conveyed with a single LED device.

The LED device will preferably be illuminated or flash in a manner that the LED device on the module/appliance is externally visible. The LED device will preferably be driven in a way that is common in most electronics today, therefore reducing the learning curve of the particular user/consumer. The microprocessor/controller in the module will know the rate, and drive the LED device accordingly. The provision of a single LED device eliminates an elaborate user interface at a significant cost and power savings.

The disclosure has been described with reference to the preferred embodiments and associated method. Obviously, modifications and alterations will occur to others upon reading and understanding the preceding detailed description. It is intended that the disclosure be construed as including all such modifications and alterations.

What is claimed is:

1. A demand supply system, comprising:
   a data transmitter associated with a utility, wherein the data transmitter emits data;
   an appliance in communication with the data transmitter, the appliance comprising a demand/supply module adapted to receive the data to operate a single light source in response thereto,
   wherein the demand/supply module has at least three distinct modes and is operative in only one of the three modes at any one time, the module cycles through a first mode indicative of cost of energy use, a second mode indicative of signal strength, and a third mode indicative of module status,
   wherein the single light source is operatively associated with and included with the demand/supply module, and
   wherein operation of the single light source conveys information relating to at least two of cost of energy use, signal strength, and module status.

2. The system of claim 1 wherein the light source is a LED device.

3. The system of claim 2 wherein the LED device is a chip.

4. The system of claim 1 wherein operation of the single light source causes illuminated/non-illuminated states of the single light source that vary in response to different data received from the demand/supply module.

5. The system of claim 4 wherein the illuminated/non-illuminated states include,
   (a) a "steady illuminated" state,
   (b) a "slow flash" state,
   (c) a "fast flash" state; or
   (d) combinations of one or more of "steady illuminated", "slow flash", or "fast flash" states.

6. The system of claim 1 wherein the demand/supply module operates the light source to emit light in a constant "illuminated" state and an intermittent "illuminated" state.

7. The system of claim 6 wherein the demand/supply module operates the light source in a periodic intermittent "illuminated" state.

8. The system of claim 7 wherein the demand/supply module operates the light source such that first time periods of the "illuminated" states of the light source are substantially equal to second time periods of the "non-illuminated" states of the light source.

9. The system of claim 1 wherein the light source is mounted on an external surface of the appliance.

10. The system of claim 1 wherein a duration of the light source is varied to convey information.

11. A system, comprising:
    a module adapted to receive information relating to cost of energy use and communicate data to an associated appliance in response thereto; and
    a single light source operatively associated with the module, the light source conveying information relating to at least two of cost of energy use, signal strength, and module status,
    wherein the module has at least three distinct modes and is operative in only one of the three modes at any one time, the module cycles through a first mode indicative of cost of energy use, a second mode indicative of signal strength, and a third mode indicative of module status.

12. The system of claim 11 wherein the module has a default mode for the light source.

13. The system of claim 11 wherein the light source is capable of different "illuminated"/"non-illuminated" states in each of the modes.

14. A method of displaying system information relating to a demand supply system for an associated appliance where the system includes a module configured to receive a signal relating to cost of energy, said method comprising:
    providing a light emitting diode (LED) device for displaying information relating to cost of energy use, signal strength, and status; and
    actuating the LED device in response to cost of energy use for operating the associated appliance,
    wherein the module comprises a first, a second, and a third distinct modes and the module is operative in only one of the first, second, and third modes at any one time, further comprising cycling between the first mode representative of cost of energy use, the second mode representative of signal strength, and the third mode representative of the status.

15. The method of claim 14, wherein providing a LED device for displaying information includes using a single chip LED device for displaying the information relating to cost of energy use, signal strength, and status.

16. The method of claim 14, wherein actuating the LED device includes periodically flashing the LED device.

17. The method of claim 16, wherein periodically flashing the LED device includes altering a flash rate as the cost of energy use changes.

18. The method of claim 14 wherein actuating the LED device includes providing a "steady illuminated" state, providing a "slow flash" state, and providing a "fast flash" state in response to different levels of activity in the first, second, and third modes of operation.

19. The method of claim 14, further comprising varying a duration of "illuminated" and "non-illuminated" states of the LED device.

* * * * *

UNITED STATES PATENT AND TRADEMARK OFFICE
CERTIFICATE OF CORRECTION

PATENT NO. : 8,421,647 B2
APPLICATION NO. : 12/635017
DATED : April 16, 2013
INVENTOR(S) : Kobraei et al.

It is certified that error appears in the above-identified patent and that said Letters Patent is hereby corrected as shown below:

In the Specifications:

In Column 3, Line 46, delete "f desired" and insert -- if desired --, therefor.

Signed and Sealed this
Fourth Day of June, 2013

Teresa Stanek Rea
*Acting Director of the United States Patent and Trademark Office*